(12) United States Patent
Brown et al.

(10) Patent No.: US 12,432,336 B2
(45) Date of Patent: Sep. 30, 2025

(54) SYSTEM AND METHODS TO CALIBRATE MOBILE DEVICE CAMERA

(71) Applicant: Communications Test Design, Inc., West Chester, PA (US)

(72) Inventors: Michael Brown, Jeffersonville, IN (US); Trevor Corbin, Georgetown, IN (US); Nidhin Davis, Glen Mills, PA (US); Mark Parsons, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 155 days.

(21) Appl. No.: 18/056,765

(22) Filed: Nov. 18, 2022

(65) Prior Publication Data
US 2024/0171729 A1    May 23, 2024

(51) Int. Cl.
H04N 17/00    (2006.01)
G03B 17/56    (2021.01)
G03B 43/00    (2021.01)

(52) U.S. Cl.
CPC ......... *H04N 17/002* (2013.01); *G03B 17/561* (2013.01); *G03B 43/00* (2013.01)

(58) Field of Classification Search
None
See application file for complete search history.

(56) References Cited

U.S. PATENT DOCUMENTS

| | | | |
|---|---|---|---|
| 8,619,144 B1* | 12/2013 | Chang | H04N 17/002 348/187 |
| 11,122,445 B2* | 9/2021 | Nguyen | H04W 24/00 |
| 2013/0343743 A1* | 12/2013 | Yen | G03B 17/561 396/428 |
| 2016/0073101 A1 | 3/2016 | Keaffaber et al. | |
| 2017/0280135 A1 | 9/2017 | Shroff et al. | |
| 2017/0374360 A1* | 12/2017 | Kranski | H04N 23/90 |
| 2018/0124387 A1 | 5/2018 | Zhao et al. | |
| 2019/0126965 A1* | 5/2019 | Bacallao | H04M 1/04 |
| 2020/0014912 A1* | 1/2020 | Kytsun | H04N 17/002 |
| 2021/0208488 A1* | 7/2021 | Qian | F16M 13/00 |
| 2021/0225032 A1 | 7/2021 | Hain et al. | |
| 2021/0387637 A1 | 12/2021 | Rogers et al. | |
| 2021/0398464 A1* | 12/2021 | Katrib | G06T 7/0002 |
| 2022/0005191 A1* | 1/2022 | Connor | G06T 7/0012 |
| 2023/0199316 A1* | 6/2023 | Tulsi | F16M 11/041 396/428 |
| 2023/0405263 A1* | 12/2023 | Gartenberg | A61B 5/6892 |

FOREIGN PATENT DOCUMENTS

CN    108700250 A  *  10/2018  ......... F16M 11/041

OTHER PUBLICATIONS

International Search Report and Written Opinion for PCT/US2023/074902 dated Dec. 18, 2023.

* cited by examiner

*Primary Examiner* — Rodney E Fuller
(74) *Attorney, Agent, or Firm* — Duane Morris LLP

(57) ABSTRACT

A system to calibrate a camera of a mobile device includes a fixture configured to hold the mobile device with the camera and a display of the mobile device exposed to an outside of the fixture; and a moving mechanism to move the fixture.

18 Claims, 5 Drawing Sheets

SYSTEM AND METHODS TO CALIBRATE MOBILE DEVICE CAMERA

BACKGROUND

The present disclosure relates to a system and method to calibrate a camera of a mobile device. More specifically, the present disclosure relates to synchronizing and calibrating a camera of a mobile device using a robot.

Mobile devices, including smartphones and tablets, have become sophisticated, widespread, and pervasive. With the increasing usage of computer network services all over the world, these mobile devices are in great demand. As a result, the cost of returned, used, and refurbished mobile devices has increased.

During the process of repairing or refurbishing used mobile devices an operating system, software applications, and/or a new camera system may need to be installed. As a result, the camera system on such a mobile device may need to be paired, synchronized, or calibrated to operate properly in the mobile device system.

Modern mobile devices can use a kind of gyroscope that consists of a tiny vibrating plate on a microchip. When the orientation of the mobile device changes, that vibrating plate gets pushed around by the Coriolis or inertial forces that affect objects in motion when they rotate. The gyroscope provides a key role in estimating camera rotation during mobile video capture. The fusion of gyroscope and visual measurements needs the information of camera projection parameters, the gyroscope bias, and the relative orientation between the gyroscope and the camera. Additionally, timestamps of the gyroscope and camera images or frames may need to be synchronized. The camera calibration determines the geometric parameters of the image formation process. Alternatively, a camera depth function may need to be calibrated.

Consequently, the process of synchronizing and calibrating a camera to a mobile device system includes putting the mobile device into a camera calibration mode, physically rotating the mobile device back and forth and/or moving the mobile device side to side for a period of time, which can be up to about five (5) to ten (10) minutes, and saving a configuration of camera and mobile device system parameters gathered while the mobile device was moving.

Conventionally, an operator performing this function introduces inefficiency and inconsistency. An operator that physically moves the mobile device can calibrate only one mobile device at a time, a serial process, that prohibits the operator from performing any other function while the mobile device is being moved. The speed, range, and track of movement of the mobile device will vary for each mobile device and/or operator such that it is impossible for this manual motion to be repeatable. Therefore, there is a need to minimize operator interaction and standardize movement to increase the throughput of camera calibration procedures for mobile devices.

SUMMARY

The system and method of the present disclosure provide automated synchronization and calibration of a mobile device camera. Automating this procedure, as described in the present disclosure permits a single operator to repeatedly calibrate many mobile device cameras at the same time, thus increasing efficiency, throughput, and consistency. The disclosed system and method uses custom fixtures to hold mobile devices and move them for camera calibration.

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

To overcome the problems described above, embodiments of the present disclosure include a system to calibrate a camera of a mobile device, the system comprising: a fixture configured to hold the mobile device with the camera and a display of the mobile device exposed to an outside of the fixture; and a moving mechanism to move the fixture.

The system can further include a diagnostic suite configured to be paired to the mobile device.

In an aspect, the fixture is a plurality of fixtures.

In an aspect, the fixture includes a clear window.

In an aspect, the moving mechanism is configured to move the fixture by rotating the fixture alternating in a first direction and in a second direction that is opposite to the first direction.

In an aspect, the moving mechanism is configured to move the fixture side to side.

In an aspect, the moving mechanism includes a microcontroller programmed to operate a motor and a belt attached to the motor and the fixture.

In another embodiment, a method of calibrating a camera of a mobile device comprises: putting the mobile device into a camera calibration mode; placing the mobile device into a fixture; moving the fixture; and saving a camera calibration configuration to the mobile device.

In an aspect, the fixture is rotated.

In an aspect, the fixture is rotated plus and minus about 35 degrees.

In an aspect, the fixture is moved side to side.

The method can further include pairing the mobile device to a diagnostic suite.

The above and other features, elements, characteristics, steps, and advantages of the present invention will become more apparent from the following detailed description of preferred embodiments of the present invention with reference to the attached drawings.

DETAILED DESCRIPTION

In the following description, reference is made to the accompanying drawings that form a part thereof, and in which is shown by way of illustrating specific exemplary embodiments in which the disclosure may be practiced.

These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The system and method of the present disclosure can be used to simultaneously calibrate a plurality of mobile device cameras in a consistent and repeatable manner. The mobile device can be a cell phone, tablet, smartwatch, or the like. Using an automated calibration system improves efficiency and consistency by eliminating the need for an operator to manually move one mobile device at a time and frees the operator to perform other tasks while the movement is being performed.

Figure 1A:
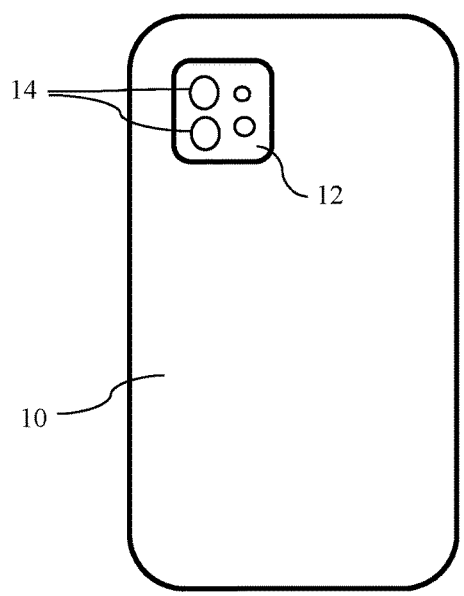
FIG. 1A, FIG. 1B, and FIG. 1C are different views of a mobile device.
Figure 1B:
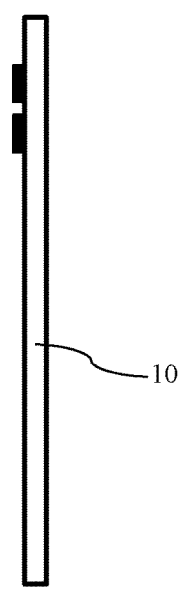
Figure 1C:
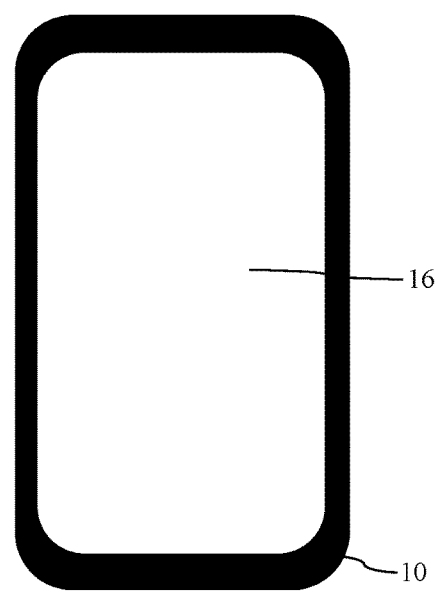

FIG. 1 includes different views of a mobile device 10. The mobile device 10 shown is a cell phone but other types and styles of mobile devices are contemplated within the scope of the disclosure. FIG. 1A is a rear view of the mobile device 10, FIG. 1B is a side view of the mobile device 10, and FIG. 1C is a front view of the mobile device 10. FIG. 1A shows that the mobile device 10 can include a region 12. Within the region 12, the mobile device can include a camera 14. For example, the region 12 shown can include more than one camera 14, for example, where one camera 14 is a standard-view camera and another camera is a wide-view camera. The region 12 can also include other components such as a proximity sensor, a light source for a flash, an ambient light sensor, a color temperature, and an infrared sensor. FIG. 1C shows that the mobile device 10 can include an electronic display 16.

When a mobile device 10 is newly manufactured, repaired, or refurbished such that a camera 14 is included or replaced, the camera 14 needs to be synchronized and/or calibrated to mate and work properly with the operating system, software applications, and other hardware components of the mobile device system. The process of synchronizing and calibrating the camera 14 to the mobile device 10 includes putting the mobile device 10 into a camera calibration mode, physically moving the mobile device 10 for a period of time to allow the calibration software to collect data, which can be up to about five (5) to ten (10) minutes, and saving a configuration of the camera 14 and mobile device 10 system parameters gathered while the mobile device 10 was moving.

The required time of movement is a function of the mobile device and its calibration procedure. The movement time may vary by type and model of mobile device. A particular mobile device needs to be moved throughout a threshold range and over a period of time necessary for the calibration software to collect the data necessary for calibration. The calibration procedure can be testing a depth function associated with the camera of a mobile device. At least some, if not all, of the steps in this procedure can be performed automatically instead of the conventional manual process.

Figure 2:
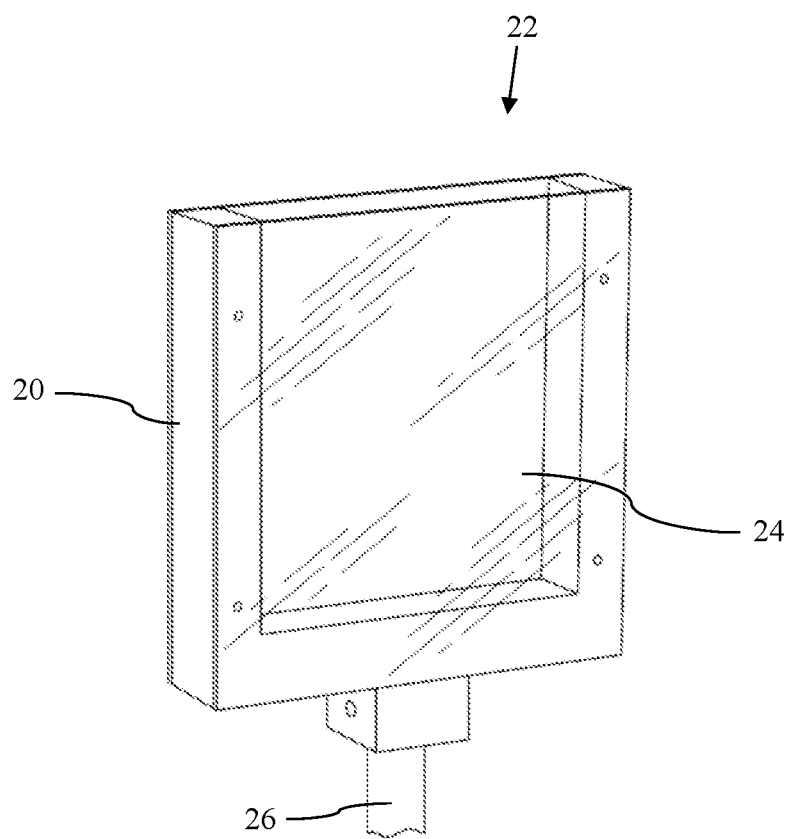
FIG. 2 is a perspective view of a fixture.

For example, a mobile device consisting of a camera that needs to be synchronized and/or calibrated can be placed into a fixture 20, shown in FIG. 2, and the fixture 20 including the mobile device can be rotated or moved mechanically. As shown in a particular embodiment in FIG. 2, the fixture 20 can be substantially box shaped or shaped like a pocket to hold a mobile device. The fixture 20 can include an opening 22 or slot in which a mobile device can be inserted. The fixture 20 is configured such that a mobile device will not fall out or away from the fixture 20 while the fixture holding the mobile device is moved or rotated. Optionally, the fixture 20 can include a clamping mechanism to hold a mobile device.

Additionally, the fixture 20 can be sized and configured such that a camera of a mobile device located in the fixture is exposed such that it can capture an image outside of the fixture 20. Optionally, because the electronic display of the mobile device shows a notification when the camera calibration is complete, the fixture can include a window 24 on at least one side so that the electronic display of the mobile device can be viewed through the window 24 while the mobile device is in the fixture 20.

As shown in FIG. 2, the fixture 20 can also include a support 26 or holding member to support the fixture 20 and connect the fixture 20 to a moving mechanism (not shown). The moving mechanism can be configured and used to move the fixture in any manner in which the camera of the mobile device can be calibrated.

Figure 3:
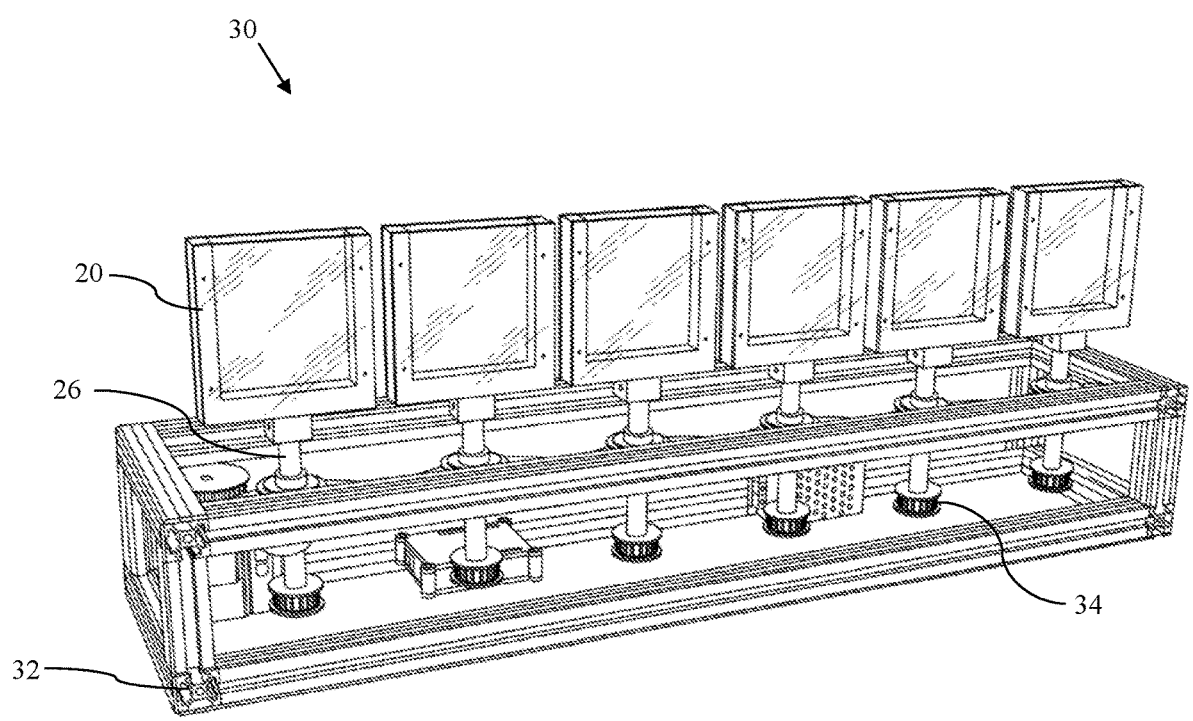
FIG. 3 is a perspective view of a calibration jig.

As shown in FIG. 3, the fixture 20 can be included with a plurality of other fixtures 20 as a component of a calibration jig 30. The calibration jig 30 can include one or more fixtures 20 where each of the fixtures 20 can include a support 26. The supports 26 can be held in place by a holder 32. The holder 32 can hold the supports 26 while allowing the supports 26 and/or the fixtures 20 to move. The holder 32 can also hold the moving mechanism 34. In an aspect, the holder 32 includes a frame and an enclosure to house the moving mechanism 34. In another aspect, the holder 32 can hold the support 26 and the moving mechanism 34 can be physically separated from the holder 32. In another aspect, the moving mechanism 34 can hold the support 26.

Movement of the supports 26 and/or fixtures 20 can be provided by the moving mechanism 34. In one aspect, the moving mechanism 34 is configured to rotate the fixture 20 in a pivoting motion where the axis of rotation is aligned with a longitudinal direction of the support 26 between the moving mechanism 34 and the fixture 20. For example, the moving mechanism 34 can rotate the fixture at about ±35 degrees, where about includes a tolerance of +/−5 degrees. In another aspect, the moving mechanism 34 is configured to move the fixture 20 left to right in a side-to-side motion or up and down in a vertical motion substantially in one plane. In another aspect, the moving mechanism 34 is configured to move the fixture 20 in a circular motion along a circular path in a plane that is substantially parallel to the display surface of a mobile device when the mobile device is located in the fixture 20. In another aspect, the moving mechanism 34 is configured to move the fixture 20 in any combination of directions that will satisfy movement required by the calibration software to collect sufficient data. It is important that the angle of rotation and the speed of the rotation is set properly. The mobile device needs the speed of rotation to be set to a point where it can register the movement and depth of objects within the camera field of view. The speed of movement can be specified for the particular type and model of mobile device or can be determined empirically. The angle is also important so that the mobile device has enough range of movement to keep the calibration active. The angle or range of movement can be specified for the particular type and model of mobile device or can be determined empirically.

Figure 4:
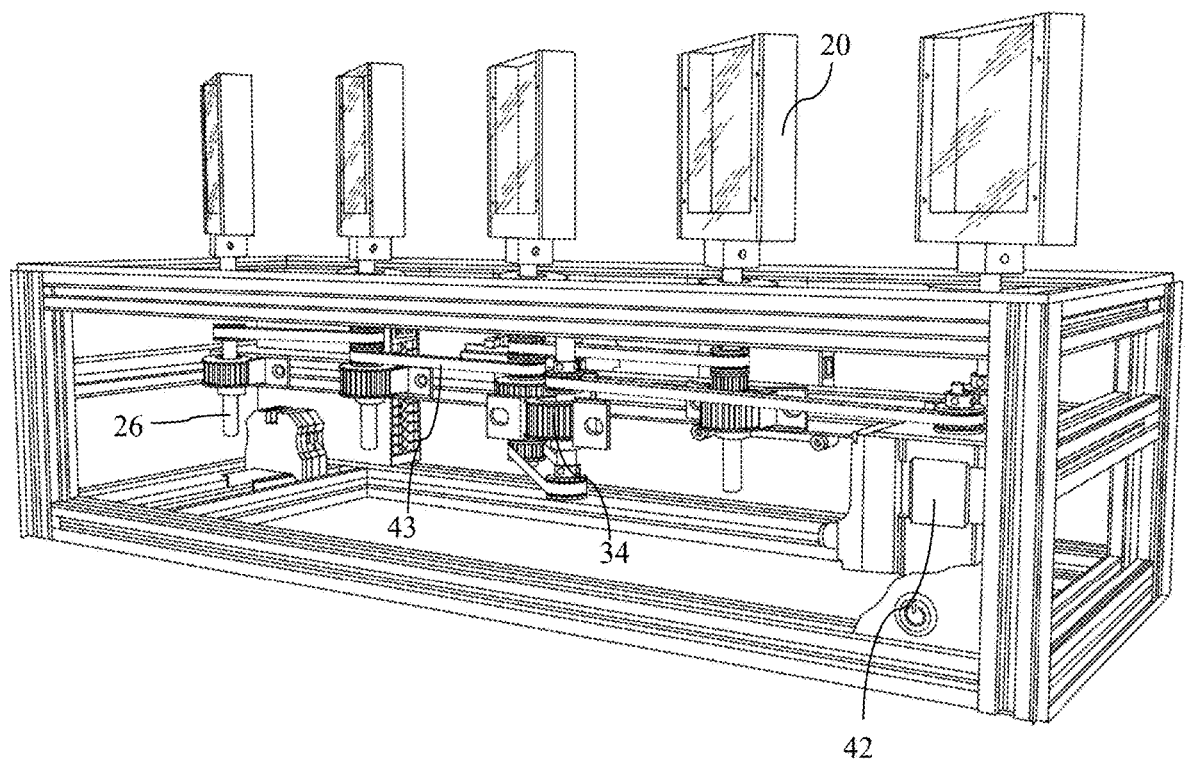
FIG. 4 is a perspective view of a calibration jig.

As shown in FIG. 4, the moving mechanism 34 can include a motor 42, such as a servo motor, along with a controller. In one aspect, the motor drives a belt 43 and pulley system that is connected to the supports 26 to move the fixtures 20. In another aspect, the motor drives a gear system 44 connected to the supports 26 to move the fixtures 20. In another aspect, the motor drives a cam system connected to the supports 26 to move the fixtures 20. Although it is contemplated that all of the plurality of fixtures 20 are moved in the same fashion, it is possible that one of the plurality of fixtures 20 can be moved with a different motion or along a different path than another of the plurality of fixtures 20. The controller can be a microcontroller, processor, computer, computer network, or any device that can be configured or programmed to control movement of the moving mechanism.

Figure 5:
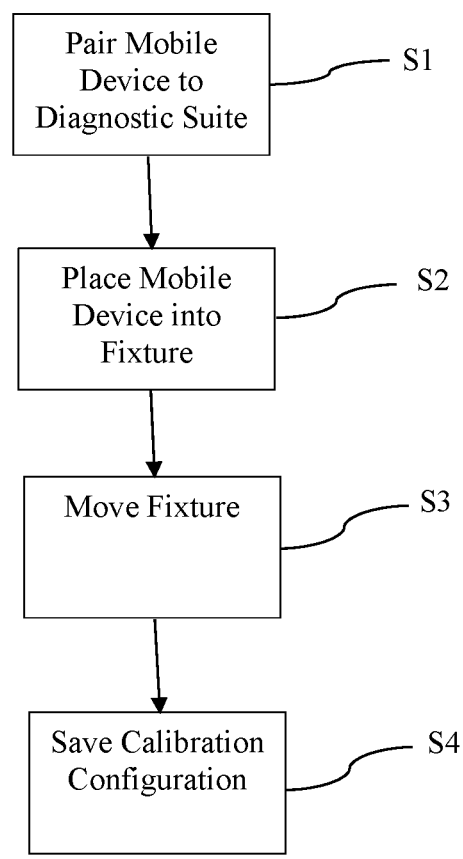
FIG. 5 is a flowchart of a method of calibrating a camera of a mobile device according to an exemplary embodiment of the present disclosure.

FIG. 5 is s flow chart showing steps of a method to calibrate a camera of a mobile device according to an embodiment of this disclosure. In step S1, a mobile device including a camera is paired with a diagnostic suite and put into a calibration mode. The diagnostic suite can include a computer or computer network running a camera calibration software application. The camera calibration software application can control gathering the necessary data and saving camera performance parameters to the mobile device. The camera calibration software application can also provide notice that calibration is complete for a particular mobile device. The notice of calibration completion can be given via a visual or audible alert provided by the mobile device or the computer. The camera calibration software application can support calibration of more than one mobile device camera simultaneously. The diagnostic suite can also include cabling or hardware necessary to interface to mobile devices for calibration. Optionally, the diagnostic suite can control movement of a moving mechanism as previously described.

In step S2, the mobile device is placed in a fixture. The fixture can be one as previously described with respect to FIG. 2. In step S3, the fixture is moved by the moving mechanism as previously described. The fixture can be one of a plurality of fixtures that, in an embodiment, are all moved at the same time by the same moving mechanism. Alternatively, one or more of the fixtures may be moved independently of one or more of the other fixtures. Different mobile device types and models can have different calibration movements and times. In one aspect, all of the fixtures are moved at substantially the same speed with the same movement while calibration times can vary by mobile device type and/or model.

The mobile device provides a notification when it has gathered the data necessary for the camera calibration. After which, the mobile device is removed from the fixture and the camera calibration configuration information is saved in the mobile device in step S4.

Using this method, a plurality of fixtures can be used to calibrate cameras in multiple mobile devices at the same time. During camera calibrations, the moving mechanism can be continuously operated to move the plurality of fixtures and an operator can place mobile devices in a fixture and remove the mobile device from the fixture while the fixture is moving. Optionally, the moving mechanism can be on timer such that it will stop moving the fixtures after a predetermined period of time, the time being at least as long as the camera needs to be moved for calibration.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A system to calibrate a camera of a mobile device, the system comprising:
   a fixture configured to hold the mobile device;
   wherein the fixture consisting of a 'U' shaped bracket having an opening and sidewalls forming an interior volume and a support secured to the lower side of the fixture; and wherein
   the camera and a display of the mobile device exposed to an outside of the fixture;
   a moving mechanism is operably coupled to the support to move the fixture; and
   a computer interfaced to the mobile device and including a camera calibration software application that controls gathering data and saving camera performance parameters to the mobile device.

2. The system of claim 1, wherein the camera calibration software application supports calibration of more than one mobile device cameras simultaneously.

3. The system of claim 1, wherein the fixture is a plurality of fixtures.

4. The system of claim 3, wherein all of the plurality of fixtures are moved at substantially a same speed with a same movement.

5. The system of claim 1, wherein the sidewalls of the fixture includes a clear window configured to view a display of the mobile device.

6. The system of claim 1, wherein the moving mechanism is configured to move the fixture by rotating the fixture alternating in a first horizontal direction and in a second horizontal direction that is opposite to the first horizontal direction.

7. The system of claim 1, wherein the moving mechanism includes a microcontroller programmed to operate a motor and a belt attached to the motor and the fixture.

8. The system of claim 1, wherein the camera calibration software provides a notice that calibration is complete.

9. The system of claim 8, wherein the notice is a visible or audible alert.

10. The system of claim 1, wherein a depth function of the mobile device is calibrated.

11. The system of claim 1, wherein the support secures the fixture to a calibration jig, wherein the calibration jig holds the movement mechanism and the fixture.

12. A method of calibrating a camera of a mobile device comprising:
   putting the mobile device into a camera calibration mode;
   interfacing the mobile device to a computer running a camera calibration software application that controls gathering data and saving camera performance parameters to the mobile device;
   placing the mobile device into a fixture;
   moving the fixture; and
   saving a camera calibration configuration to the mobile device.

13. The method of claim 12, wherein the fixture is rotated horizontally.

14. The method of claim 12, wherein the fixture is rotated plus and minus about 35 degrees.

15. The method of claim 12, wherein the camera calibration software application supports calibration of more than one mobile device cameras simultaneously.

16. The method of claim 12, wherein the fixture is a plurality of fixtures, and
   all of the plurality of fixtures are moved at substantially a same speed with a same movement.

17. The method of claim 12, wherein the camera calibration configuration includes a depth function.

18. A system to calibrate a camera of a mobile device, the system Consisting of:
   a fixture configured to hold the mobile device;
   wherein the fixture consisting of a 'U' shaped bracket having an opening and sidewalls forming an interior volume and a support secured to the lower side of the fixture; and wherein
   the camera and a display of the mobile device exposed to an outside of the fixture;
   a moving mechanism is operably coupled to the support to move the fixture;
   wherein the moving mechanism is configured to move the fixture by rotating the fixture alternating in a first horizontal direction and in a second horizontal direction that is opposite to the first horizontal direction; and
   a computer interfaced to the mobile device and including a camera calibration software application that controls gathering data and saving camera performance parameters to the mobile device.

* * * * *